United States Patent
Rohrbach

(10) Patent No.: US 8,008,372 B2
(45) Date of Patent: Aug. 30, 2011

(54) POLYMER COMPOSITIONS CONTAINING PHOSPHATES

(75) Inventor: William Douglas Rohrbach, Perkasie, PA (US)

(73) Assignee: Rohm and Haas Company, Philadelphia, PA (US)

( * ) Notice: Subject to any disclaimer, the term of this patent is extended or adjusted under 35 U.S.C. 154(b) by 154 days.

(21) Appl. No.: 12/592,181

(22) Filed: Nov. 20, 2009

(65) Prior Publication Data

US 2010/0130643 A1 May 27, 2010

Related U.S. Application Data

(60) Provisional application No. 61/199,971, filed on Nov. 21, 2008.

(51) Int. Cl.
 *C08C 1/08* (2006.01)
(52) U.S. Cl. .......... 523/335; 524/414; 524/417
(58) Field of Classification Search .......... 523/335; 524/414, 417
 See application file for complete search history.

(56) References Cited

U.S. PATENT DOCUMENTS

| | | | |
|---|---|---|---|
| 4,532,290 A | 7/1985 | Jaquiss | |
| 4,876,306 A | 10/1989 | Kurokawa | |
| 5,290,867 A | 3/1994 | Gilg | |
| 5,354,791 A | 10/1994 | Gallucci | |
| 5,608,027 A | 3/1997 | Crosby | |
| 5,919,849 A | 7/1999 | Memon | |
| 6,326,423 B1 | 12/2001 | Eckel et al. | |
| 6,545,089 B1 | 4/2003 | DeRudder | |
| 7,285,585 B2 | 10/2007 | Coyle | |
| 7,413,842 B2 | 8/2008 | Vanbesien | |
| 2008/0200331 A1 * | 8/2008 | Daniel et al. | 502/402 |
| 2009/0036607 A1 | 2/2009 | Hirai et al. | |

OTHER PUBLICATIONS

C.A. Pryde, "The Hydrolytic Stability of Some Commercially Available Polycarbonates," Polymer Engineering and Science, vol. 22, No. 6, pp. 370-375, 1982.

* cited by examiner

*Primary Examiner* — Edward Cain
(74) *Attorney, Agent, or Firm* — Carl P. Hemenway

(57) ABSTRACT

In a first aspect of the present invention, there is provided a polymer composition comprising
 (i) one or more multistage polymer comprising
  (a) a first stage polymer having Tg of 0° C. or lower,
  (b) a subsequent stage polymer having Tg of 20° C. or higher,
 (ii) one or more phosphate salt of a multivalent cation, and
 (iii) one or more alkaline phosphate, in the amount of 100 ppm or more, measured as the weight of phosphorous, based on the dry weight of said multistage polymer.

In a second aspect of the present invention, there is provided a mixture comprising the polymer composition of the first aspect described above and one or more matrix resin.

In a third aspect of the present invention, there is provided a process for making a polymer composition comprising the steps of providing a multistage polymer latex, coagulating said multistage polymer latex, mixing said multistage polymer with an aqueous solution of an alkaline phosphate, and drying said multistage polymer to a water content of less than 1% by weight of water based on the dry weight of said multistage polymer, wherein said dried multistage polymer comprises 100 ppm or more, based on the dry weight of said multistage polymer, of phosphorous that is in the form of an alkaline phosphate.

8 Claims, No Drawings

POLYMER COMPOSITIONS CONTAINING PHOSPHATES

This application claims the benefit of priority under 35 U.S.C. §119(e) of U.S. Provisional Patent Application No. 61/199,971 filed on Nov. 21, 2008.

BACKGROUND

In some situations it is desirable to provide a polymeric composition that contains both a polymer and a multivalent cation. One example of such a situation is one in which it is desired to coagulate a polymer latex, for example as part of a process of separating the polymer of the latex from the water of the latex. Two common ways of performing such separation are coagulation and spray drying. Coagulation has the advantage that the equipment required to perform coagulation requires less capital expense than the equipment required to perform spray drying. Coagulation has the disadvantage that the coagulation process normally introduces multivalent cations into the solid polymer. In some cases, the presence of a multivalent cation in a polymer composition is a drawback. For example, if the polymer composition is used as an additive in a matrix resin, the multivalent cation sometimes causes deleterious effects on the matrix resin.

U.S. Pat. No. 5,290,867 discloses producing an emulsion graft copolymer, coagulating that graft copolymer with an alkaline earth metal compound, and then using that graft copolymer for reinforcing natural rubber, for modifying rubber-based adhesives, or in fibers or films.

It is desired to provide polymer compositions that contain multivalent cation and that reduce or eliminate the drawbacks that normally occur when a multivalent cation is present in a polymer composition. Such a desired composition would have various benefits. For example, such a desired composition, when used as an additive to a matrix resin, would reduce or eliminate the deleterious effects on the matrix resin that would have been caused by a previously-known additive with a similar level of multivalent cation.

In one particular example, it is desired to produce a polymer as part of a polymer latex; to separate that polymer from the water of the latex; and to use the separated polymer as an additive in a matrix resin. Using previously-known methods, there would be a choice: either (1) incurring relatively high expense by separating the polymer from the water of the latex by spray drying, or (2) introducing deleterious multivalent cations by separating the polymer from the water of the latex by coagulation. In this particular example, it is desired to provide a method of reducing or eliminating the deleterious effects of the multivalent cation, because the use of such a method would allow a coagulated polymer to be used as an additive to a matrix resin without causing the deleterious effects from the multivalent cation that would otherwise have occurred.

STATEMENT OF THE INVENTION

In a first aspect of the present invention, there is provided a polymer composition comprising
  (i) one or more multistage polymer comprising
    (a) a first stage polymer having Tg of 0° C. or lower,
    (b) a subsequent stage polymer having Tg of 20° C. or higher,
  (ii) one or more phosphate salt of a multivalent cation, and
  (iii) one or more alkaline phosphate, in the amount of 100 ppm or more, measured as the weight of phosphorous, based on the dry weight of said multistage polymer.

In a second aspect of the present invention, there is provided a mixture comprising the polymer composition of the first aspect described above and one or more matrix resin.

In a third aspect of the present invention, there is provided a process for making a polymer composition comprising
  (I) providing a multistage polymer latex, wherein said multistage polymer comprises
    (a) a first stage polymer having Tg of 0° C. or lower,
    (b) a subsequent stage polymer having Tg of 20° C. or higher,
  (II) coagulating said multistage polymer latex by mixing said multistage polymer latex with one or more water-soluble salt of a multivalent cation,
  (III) optionally, after said step (II), washing said multistage polymer with water,
  (IV) after said step (III), mixing said multistage polymer with an aqueous solution of an alkaline phosphate,
  (V) after said step (IV), drying said multistage polymer to a water content of less than 1% by weight of water based on the dry weight of said multistage polymer,
wherein, after said step (V), said dried multistage polymer comprises 100 ppm or more, based on the dry weight of said multistage polymer, of phosphorous that is in the form of an alkaline phosphate.

DETAILED DESCRIPTION

A "polymer," as used herein and as defined by F W Billmeyer, JR. in *Textbook of Polymer Science*, second edition, 1971, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer molecular weights can be measured by standard methods such as, for example, size exclusion chromatography (SEC, also called gel permeation chromatography). Generally, polymers have weight-average molecular weight (Mw) of 1,000 or more. Polymers may have extremely high Mw; some polymers have Mw above 1,000,000; typical polymers have Mw of 1,000,000 or less. Some polymers are crosslinked, and crosslinked polymers are considered to have infinite Mw. Some polymers are characterized by Mn, the number-average molecular weight.

As used herein "weight of polymer" means the dry weight of polymer.

Molecules that can react with each other to form the repeat units of a polymer are known herein as "monomers."

One example of a class of monomers that are useful in the present invention are, for example, ethylenically unsaturated monomers (i.e., monomers that have at least one carbon-carbon double bond). Typical ethylenically unsaturated monomers have molecular weight of less than 500. Among such monomers are, for example, vinyl monomers, which are molecules that have at least one vinyl group (i.e.,

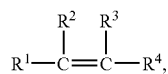

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Some suitable vinyl monomers include, for example, styrene, substituted styrenes, dienes, ethylene, ethylene derivatives, and mixtures thereof. Ethylene derivatives include, for example, unsubstituted or substituted versions of the following: vinyl acetate, acrylonitrile, (meth)acrylic acid, (meth)acrylates, (meth)acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. In some embodiments, substituted monomers include, for example, monomers with more than one carbon-carbon double bond, monomers with hydroxyl groups, monomers with other functional groups, and monomers with combinations of functional groups. An "unsubstituted (meth)acrylate monomer" is an unsubstituted alkyl ester of (meth)acrylic acid.

Some monomers are known herein as acid-functional monomers. An acid-functional monomer is a monomer that has an acid group such as, for example, a sulfonic acid group or a carboxylic acid group. The acid group may be present in non-ionized form (for example, as a carboxylic acid group) or may be present in the form of an anion (for example, as a carboxylate anion). The acid group remains intact during the polymerization process, and the resulting polymer has the acid group attached to it. Some acid-functional monomers are, for example, acrylic acid and methacrylic acid.

Some monomers are multifunctional monomers. A multifunctional monomer contains two or more functional groups that are capable of participating in a polymerization reaction. Some multifunctional monomers have two or more vinyl groups capable of participating in a polymerization reaction with vinyl groups on other monomers. Multifunctional monomers, when more that one functional group participates in a polymerization reaction, contribute branching to the polymer thus formed. When branching is so extensive that all or a portion of the polymer is not soluble in any solvent, then that portion of the polymer is considered crosslinked.

A polymer that is made by polymerizing a certain monomer, either alone or with other monomers, is said herein to include that monomer as a polymerized unit.

Some polymers are "multistage" polymers. A multistage polymer is a polymer that is made by forming (i.e., polymerizing) a first polymer, called the "first stage" or the "first stage polymer," and then, in the presence of the first stage, forming a second polymer, called the "second stage" or the "second stage polymer." A multistage polymer has at least two stages. Some multistage polymers have 3, 4, or more stages. In some cases, the first stage may be polymerized in the presence of a polymer called a "seed." A polymer is a "seed" instead of a "first stage" if the weight of that polymer is 5% or less of the weight of the multistage polymer. A multistage polymer contains a first stage, optional intermediate stages, and a final stage. Each intermediate stage is formed in the presence of the polymer resulting from the polymerization of the stage immediately previous to that intermediate stage. If any intermediate stage is made, the final stage is formed in the presence of the last intermediate stage; if no intermediate stage is made, the final stage is formed in the presence of the first stage.

Some polymers exist in the form of a "latex." As used herein, latex is a physical form of a polymer in which the polymer is present in the form of small polymer particles that are dispersed in water. In a polymer latex, the mean diameter of the polymer particles may be 50 nanometers or larger and may be less than 1 micrometer. In some cases, the latex is formed as part of the process of polymerizing monomer to form the polymer. In other cases, the polymer is provided in some other physical form, and then the physical form is altered to create a latex, for example by a process of solubilization, possibly involving intensive mixing and addition of surfactant.

Some polymers are produced by emulsion polymerization. Emulsion polymerization is a well known process, described, for example, by M. S. El-Aasser in "Emulsion Polymerization" (Chapter 1 of *An Introduction to Polymer Colloids*, edited by F. Candau and R. H. Ottewill, Kluwer Academic Publishers, 1990), and by D. C. Blackley in *Emulsion Polymerization* (Wiley, 1975). Normally, a polymer produced by aqueous emulsion polymerization is in the form of a latex.

Polymers may be characterized by their glass transition temperatures (Tg). Tg is normally measured by differential scanning calorimetry (DSC). A polymer with Tg of 0° C. or lower is considered herein to be "soft." A polymer with Tg of 30° C. or higher is considered herein to be "hard."

When the Tg's of some multistage polymers are measured, more than one Tg is observed. It is considered that at least one stage has its own Tg. The Tg observed for one stage of a multistage polymer may be the same as the Tg that is characteristic of the polymer that forms that stage (i.e., the Tg that would be observed if the polymer that forms that stage were formed and measured in isolation from the other stages). In some cases, the Tg observed for one stage of a multistage polymer may be different from the Tg characteristic the polymer that forms that stage; in such cases, it is considered that the polymer of that stage has blended with some or all of the polymer from one or more of the other stages.

Herein, when a monomer is said to have a certain Tg, it is meant that a homopolymer made from that monomer has that Tg.

As used herein, a "multivalent cation" is a cation with a charge of +2 or higher. Multivalent cations typically are multivalent metal ions or alkaline earth ions. A multivalent cation is considered herein to be present in a composition if it is present as a dissolved cation or if it is present as the cation of one or more non-dissolved salt or as a mixture thereof. Such a non-dissolved salt may have an inorganic anion or an organic anion.

As used herein, "phosphate" refers to an anion that is made up of phosphorus and oxygen atoms. Included are orthophosphate ($PO_4^{-3}$), the polyphosphates ($P_nO_{3n+1}^{-(n+2)}$ where n is 2 or larger), and the metaphosphates (circular anions with the formula $P_mO_{3m}^{-m}$ where m is 2 or larger). An "alkaline phosphate" is a salt of an alkali metal cation with a phosphate anion. Alkaline phosphates include alkali metal orthophosphates, alkali metal polyphosphates, and alkali metal metaphosphates. Alkaline phosphates also include partially neutralized salts of phosphate acids, including, for example, partially neutralized salts of orthophosphoric acid such as, for example, monosodium dihydrogen phosphate and disodium hydrogen phosphate.

A compound is considered "water-soluble" herein if the amount of that compound that can be dissolved in water at 20° C. is 5 g or more of compound per 100 ml of water. A compound is considered "water-insoluble" herein if the amount of that compound that can be dissolved in water at 20° C. is 0.5 g or less of compound per 100 ml of water. If the amount of a compound that can be dissolved in water at 20° C. is between 0.5 g and 5 g per 100 ml of water, that compound is said herein to be "partially water-soluble."

As used herein, a certain anion is said to be present in a composition in "equivalent amount" with respect to a certain cation when the amount of that anion is the exact amount necessary to achieve electrical neutrality with that cation. For example, if N moles of a specific anion that has charge of −i are present in a composition that also has M moles of a specific cation that has charge of +j, that anion is said herein to be present in an equivalent amount to that cation if N times i equals M times j. Any amount of a certain anion that is present above the equivalent amount with respect to a certain cation is said herein the be the amount of that anion in "equivalent excess" over that cation.

As used herein, when a ratio of two numbers is said to be "X:1 or higher," it is meant that the ratio has the value Y:1, where Y is equal to or greater than X. Similarly, when a ratio of two numbers is said to be "W:1 or lower," it is meant that the ratio has the value Z:1, where Z is equal to or lower than W.

As used herein, when it is stated that "the polymer composition contains little or no" substance, it is meant that the polymer composition contains none of that substance, or, if any of that substance is present in the present composition, the amount of that substance is 1% or less by weight, based on the weight of the polymer composition. Among embodiments that are described herein as having "little or no" certain substance, embodiments are envisioned in which there is none of that certain substance.

The polymer composition of the present invention contains a multistage polymer. In some embodiments, the multistage polymer is made by emulsion polymerization. In some embodiments, the multistage polymer is made by aqueous emulsion polymerization. In aqueous emulsion polymerization, water forms the continuous medium in which polymerization takes place. The water may or may not be mixed with one or more additional compounds that are miscible with water or that are dissolved in the water. In some embodiments, the continuous medium contains 30% or more water; or 50% or more water; or 75% or more water; or 90% or more water; by weight based on the weight of the continuous medium.

Emulsion polymerization involves the presence of one or more initiator. The initiator is usually water-soluble. Initiator is a compound that forms one or more free radical, which can initiate a polymerization process. Some suitable initiators form one or more free radical when heated. Some suitable initiators are oxidants and form one or more free radical when mixed with one or more reductant, or when heated, or a combination thereof. Some suitable initiators form one or more free radical when exposed to radiation such as, for example, ultraviolet radiation or electron beam radiation. A combination of suitable initiators is also suitable.

Emulsion polymerization involves the use of one or more surfactant. In some embodiments, the emulsion process for producing polymer involves the use of one or more anionic surfactant. Suitable anionic surfactants include, for example, carboxylates, sulfosuccinates, sulfonates, and sulfates. In some embodiment, no carboxylate surfactant is used. Independently, in some embodiments, one or more anionic surfactant is used that is selected from sulfosuccinates, sulfonates, and sulfates. In some embodiments, every surfactant is selected from sulfosuccinates, sulfonates, and sulfates. Associated with each anionic surfactant is a cation; suitable cations include, for example, ammonium, cation of an alkali metal, and mixtures thereof. In some embodiments, one or more sulfonate surfactant is used. In some embodiments, every surfactant is a sulfonate surfactant.

In the multistage polymer of the present invention, the first stage is a soft polymer. In some embodiments, the first stage polymer has Tg of −10° C. or lower; or −25° C. or lower; or −40° C. or lower. In some embodiments, the Tg of the first stage polymer is −150° C. or higher, or −100° C. or higher. The multistage polymer contains at least one subsequent stage polymer that is hard. In some embodiments that hard polymer has Tg of 50° C. or higher, or 90° C. or higher. In some embodiments, the Tg of that hard polymer is 250° C. or lower, or 200° C. or lower.

In some embodiments, the final stage of the multistage polymer is a hard polymer.

In some embodiments, the multistage polymer is made by emulsion polymerization to form a latex. In such embodiments, the latex has mean particle size of 50 nm or higher; or 100 nm or higher. Independently, in such embodiments, the latex has mean particle size of less than 1 micrometer; or less than 800 nm; or less than 600 nm.

For example, among embodiments in which the multistage polymer is made by emulsion polymerization, there are some embodiments in which the first stage forms a polymer latex, and then most or all of each subsequent stage forms on or in the particles formed by the previous stage. In some of such embodiments, most or all of each subsequent stage forms mostly on the surface of the particles remaining from the previous stage. In such embodiments, it is considered that each subsequent stage forms a partial or complete shell around each of the particles remaining from the previous stage, and the multistage polymer that results is known herein as a "core/shell" polymer.

In some embodiments, the first stage contains polymerized units of one or more substituted or unsubstituted diene, one or more substituted or unsubstituted styrene, one or more substituted or unsubstituted (meth)acrylate monomer, (meth)acrylic acid, or mixtures thereof. In some embodiments, the first stage contains polymerized units of one or more (meth)acrylate monomer that has Tg of 0° C. or lower. In some embodiments, the first stage contains polymerized units of one or more of ethyl acrylate, butyl acrylate, 2-ethylhexyl acrylate, and mixtures thereof. In some embodiments, in the first stage, the total amount of (meth)acrylate monomers having Tg of 0° C. or lower, by weight based on the weight of the first stage, is 50% or higher; or 75% or higher; or 90% or higher.

In some embodiments, the first stage contains polymerized units of one or more multifunctional monomer. When a multifunctional monomer is present in the first stage, the amount of multifunctional monomer may be, by weight based on the weight of the first stage, 0.01% or more; or 0.03% or more; or 0.1% or more; or 0.3% or more. When a multifunctional monomer is present in the first stage, the amount of multifunctional monomer may be, by weight based on the weight of the first stage, 5% or less; or 2% or less.

In some embodiments, no multifunctional monomer is used in the first stage.

In some embodiments, no diene monomer is used in the first stage. In some embodiments, one or more diene monomer is present in the first stage. Suitable diene monomers include, for example, butadiene and isoprene. In some embodiments, the first stage contains polymerized units of butadiene. In some embodiments, the amount of polymerized units of diene monomer in the first stage is, by weight based on the weight of the first stage, 2% or more; or 5% or more; or 10% or more; or 20% or more; or 50% or more; or 75% or more. In some embodiments, the amount of polymerized units of diene monomer in the first stage is, by weight based on the weight of the first stage, 100% or less; or 98% or less; or 90% or less.

In some embodiments, no styrene or substituted styrene monomer is used in the first stage. In some embodiments, the first stage contains polymerized units of styrene, substituted styrene, or a mixture thereof. Suitable substituted styrenes include, for example, alpha-alkyl styrenes, such as, for example, alpha-methyl styrene. In some embodiments, the total amount of polymerized units of styrene and substituted styrenes in the first stage is, by weight based on the weight of the first stage is 1% or more; or 2% or more; or 5% or more; or 10% or more. In some embodiments, the total amount of polymerized units of styrene and substituted styrenes in the first stage is, by weight based on the weight of the first stage is 80% or less; or 50% or less; or 25% or less; or 10% or less; or 5% or less.

In some embodiments, the first stage contains polymerized units of one or more diene monomer and polymerized units of one or more styrene or substituted styrene monomer. In some of such embodiments, the total amount of polymerized units of diene monomer and styrene or substituted styrene monomer is, by weight based on the weight of the first stage, 5% or more; or 10% or more; or 20% or more; or 50% or more; or 75% or more; or 90% or more. In some of such embodiments, the total amount of polymerized units of diene monomer and styrene or substituted styrene monomer is, by weight based on the weight of the first stage, 100% or less; or 98% or less; or 95% or less.

In some embodiments, the first stage contains polymerized units of acid-functional monomer in the amount, by weight based on the weight of first stage, of 3% or less, or 2% or less; or 1% or less; or 0.5% or less; or none.

In some embodiments, the final stage contains polymerized units of one or more of styrene, one or more substituted styrene, one or more (meth)acrylate monomer, and (meth)acrylic acid. In some embodiments, the final stage contains polymerized units of one or more of styrene, alpha-methyl styrene, methyl methacrylate, and butyl acrylate. In some embodiments, in the final stage, the total amount of polymerized units of monomers having Tg of 80° C. or higher is, by weight based on the weight of the final stage, 50% or higher; or 75% or higher; or 90% or higher; or 100%.

In some embodiments, the final stage contains polymerized units of acid-functional monomer in the amount, by weight based on the weight of final stage, of 3% or less, or 2% or less; or 1% or less; or 0.5% or less; or none.

In some embodiments, the multi-stage polymer contains polymerized units of acid-functional monomer in the amount, by weight based on the weight of multi-stage polymer, of 3% or less, or 2% or less; or 1% or less; or 0.5% or less; or none.

In some embodiments, the weight ratio of the first stage to the final stage is 0.1:1 or higher; or 0.2:1 or higher; or 0.4:1 or higher; or 1:1 or higher; or 1.5:1 or higher; or 3:1 or higher; or 4:1 or higher. Independently, in some embodiments, the weight ratio of the first stage to the final stage is 50:1 or lower; or 25:1 or lower; or 20:1 or lower.

In some embodiments, the amount of the sum of all intermediate stages, by weight based on the total weight of the multistage polymer, is 0%; or 0% or higher; or 1% or higher; or 2% or higher; or 5% or higher; or 10% or higher. Independently, in some embodiments, the amount of the sum of all intermediate stages, by weight based on the total weight of the multistage polymer, is 60% or less; or 40% or less; or 20% or less.

The composition of the present invention contains one or more phosphate salt of a multivalent cation. Suitable multivalent cations include, for example, multivalent metal cations and alkaline earth cations. Suitable multivalent cations include, for example, aluminum (+3), calcium (+2), cobalt (+2), copper (+2), iron (+2), magnesium (+2), zinc (+2), and mixtures thereof. In some embodiments, calcium (+2), magnesium (+2), or a mixture thereof is used. In some embodiments, every multivalent cation that is present is calcium (+2) or magnesium (+2) or a mixture thereof.

The amount of multivalent cation in the composition of the present invention is not critical. The amount of multivalent cation may vary widely among embodiments of the present invention. In some embodiments, the amount of polyvalent cation is, by weight based on the dry weight of multistage polymer, 10 ppm or more; or 30 ppm or more; or 100 ppm or more. Independently, in some embodiments, the amount of polyvalent cation is, by weight based on the dry weight of multistage polymer, 3% or less; or 1% or less; or 0.3% or less.

In some embodiments, one or more multivalent cation is chosen that has the characteristic that the orthophosphate salt of that multivalent cation is water insoluble while the chloride salt of that multivalent cation is water soluble.

Within the phosphate salt of a multivalent cation, the anion is one or more of orthophosphate, one or more pyrophosphate, one or more metaphosphate, or a mixture thereof. In some embodiments, the anion of the phosphate salt of a multivalent cation is orthophosphate. In some embodiments, no phosphate anion is present other than orthophosphate.

In some embodiments, the phosphate salt of a multivalent cation is water insoluble.

The amount of phosphate salt of a multivalent cation is not crucial to the practice of the present invention. In some embodiments, the molar ratio of the amount of phosphate ion that is present in the form of phosphate salt of a multivalent cation to the amount of phosphate ion that would be needed to achieve electrical neutrality with that multivalent cation is 0.75:1 or higher; or 0.85:1 or higher; or 0.9:1 or higher; or 0.95:1 or higher; or 0.99:1 or higher. Independently, in some embodiments, that same ratio is 1.25 or lower; or 1.15 or lower; or 1.1 or lower; or 1.05 or lower; or 1.01 or lower.

Also, the amount of phosphate salt that is present in the composition can be characterized by the weight of elemental phosphorous that is present in the phosphate ions in that salt, expressed as parts per million ("ppm") or as percent, based on the dry weight of the multistage polymer.

In some embodiments, the amount of phosphate salt of a multivalent cation, as characterized by weight of phosphorous based on the dry weight of multistage polymer, is 10 ppm or more; or 30 ppm or more; or 100 ppm or more. Independently, in some embodiments, the amount of phosphate salt of a multivalent cation, as characterized by weight of phosphorous based on the dry weight of multistage polymer, is 3% or less; or 1% or less; or 0.3% or less; or 0.1% or less.

In some embodiments, most or all of the multivalent cation that is present in the composition is in the form of a water insoluble phosphate salt. In some embodiments, the molar amount of multivalent cation that is present in the form of a water insoluble phosphate salt is, based on the total moles of multivalent cation present in the composition, 80% or more; or 90% or more; or 95% or more; or 98% or more; or 100%.

The present composition contains one or more alkaline phosphate. In some embodiments, one or more alkaline phosphate is used that is water soluble. Suitable alkali metals include, for example, sodium, potassium, and mixtures thereof. The amount of alkaline phosphate, as characterized by weight of phosphorous, based on the dry weight of multistage polymer, is 100 ppm or more; or 300 ppm or more.

Independently, the amount of alkaline phosphate, as characterized in that way, is 1% or less; or 0.5% or less; or 0.25% or less; or 0.1% or less.

In some embodiments of the present invention, a multistage polymer as described above is provided in the form of a latex. In some embodiments it may be desirable to convert the multistage polymer to a solid form such as pellets or powder. One useful method of removing the polymer from a latex is coagulation.

One method of coagulating the polymer in a latex is by the addition of a salt. Latex may be brought into contact with a salt by any means. For example, a solid salt or a solution of a salt may be added into the latex. For another example, latex may be added into a solution of a salt. Other methods may also be used, including, for example, introducing latex and salt solution into a flowing stream.

While the present invention is not limited by any theory, it is contemplated that some latexes are stabilized by the presence of anionic surfactant. It is contemplated that anionic surfactant adsorbs onto the surface of each polymer particle in the latex; that an electrical double layer establishes around each latex particle; and that the latex is stabilized by the electrostatic repulsion between the electrical double layers of the various particles. That is, when brownian motion brings two latex particles into proximity, the electrostatic repulsion of the electrical double layers keeps the two latex particles from approaching each other closely. It is contemplated that, when soluble salt is added to such a latex, the presence of the ions from the salt compress the electrical double layer on each particle, and latex particles can then approach each other more closely. When the salt concentration is high enough, it is contemplated that the latex particles can collide and agglomerate, thus coagulating the polymer. In such a coagulation process, it is known that salts with monovalent cations are inefficient, as they require extremely high concentrations in order to cause coagulation. For the coagulation process to have practical usefulness, coagulation is performed using one or more salt with a multivalent cation. The anion is normally chosen so that the salt that is used for coagulation is water soluble.

In some embodiments, coagulation is performed using a salt that has chloride anion. Independently, in some embodiments, coagulation is performed using a salt, the cation of which is calcium (+2), magnesium (+2), or a mixture thereof.

In some embodiments, the coagulated latex exists in the form of large particles (mean diameter larger than 1 micrometer) that remain suspended in water as long as vigorous stirring is applied but that settle to the bottom of the container if stirring is stopped. Such a form is known herein as a "slurry."

In some embodiments, coagulated polymer is removed from the slurry, for example by filtration (including, for example, gravity filtration and/or vacuum filtration) or centrifugation or a combination thereof.

Coagulated polymer is optionally washed with water one or more times. Coagulated polymer is a complex structure, and it is known that water cannot readily contact every portion of the coagulated polymer. Consequently, while the present invention is not bound by any specific theory, it is contemplated that washing coagulated polymer is an inefficient process. Thus it is expected that any washing process that is practical to perform will leave behind a significant amount of multivalent cation.

In some embodiments, subsequent to any washing step or steps that are performed, the coagulated polymer is treated with an alkaline phosphate. For example, an aqueous solution of an alkaline phosphate may be sprayed onto the coagulated polymer. For another example, the coagulated polymer may be placed into a container that contains an aqueous solution of alkaline phosphate, optionally with stirring, followed by separating the coagulated polymer from the aqueous solution, possibly, for example, by filtration.

In some embodiments, most or all of the water that remains with the coagulated polymer is removed from the coagulated polymer by one or more of the following operations: filtration (including, for example, vacuum filtration), centrifugation, and/or drying (such as, for example, in an oven or in a fluid-bed dryer).

A polymer composition of the present invention may be dry. A polymer composition is considered herein to be dry if it contains water, by weight based on the total weight of the polymer composition, in the amount of 1% or less; or 0.5% or less.

In some embodiments, the method of treating the coagulated polymer with alkaline phosphate is chosen with the purpose of controlling the amount of phosphate ion that is retained in the dry form of the polymer composition of the present invention. In some embodiments, the amount of phosphate ion retained in the dry form of the polymer composition of the present invention is in equivalent excess over the multivalent cations present in the polymer composition of the present invention. In some embodiments, the amount of phosphate ion retained in the dry form of the polymer composition of the present invention that is in excess over the multivalent cations present in the polymer composition of the present invention is, by weight of phosphorous, based on the dry weight of the multistage polymer, 100 ppm or more; or 300 ppm or more. Independently, in some embodiments, the amount of phosphate ion retained in the dry form of the polymer composition of the present invention that is in excess over the multivalent cations present in the polymer composition of the present invention is, by weight of phosphorous, based on the dry weight of the multistage polymer, is 1% or less; or 0.5% or less; or 0.25% or less; or 0.1% or less.

In some embodiments, dry form of a polymer composition of the present invention will be a powder, with mean particle diameter 1 micrometer to 1 mm. Among embodiments in which the multistage polymer was in latex form prior to being separated from the water of the latex and dried to form a powder, it is contemplated that under the correct circumstances (such as, for example, melt mixing the polymer composition with certain matrix resins) the powder particles may be broken apart, allowing the original latex particles to be distributed individually. In such embodiments, the multistage polymer, even while it is in the form of a dry powder, is said to have "particle size" that is the particle size of the latex particles.

In some embodiments, one or more flow aid may be added to a multistage polymer of the present invention. A flow aid is a hard material in the form of a powder (mean particle diameter of 1 micrometer to 1 mm). The material of the flow aid may be a hard polymer (Tg of 80° C. or higher; or 95° C. or higher) or may be a mineral (such as, for example, silica).

In some embodiments, one or more stabilizer is added to a multistage polymer of the present invention. Some suitable stabilizers are, for example, antioxidants. Some suitable antioxidants include, for example, radical scavengers, peroxide decomposers, metal deactivators, and mixtures thereof. Some suitable radical scavengers include, for example, hindered phenols, secondary aromatic amines, hindered amines, hydroxylamines, benzofuranones, and mixtures thereof. Some suitable peroxide decomposers include, for example, organic sulfides (such as, for example, divalent sulfur compounds), esters of phosphorous acid ($H_3PO_3$), hydroxyl amines, and mixtures thereof. Some suitable metal deactivators include, for example, chelating agents such as, for example ethylenediaminetetraacetic acid.

Hindered phenol stabilizers are compounds that contain an aromatic ring that has a hydroxyl group attached to at least one carbon of the aromatic ring and that also has a bulky alkyl group attached to at least one of the carbon atoms of the aromatic ring adjacent to the carbon atom to which the hydroxyl group is attached. Bulky alkyl groups are secondary or tertiary and have 3 or more carbon atoms. Some suitable hindered phenol stabilizers, for example, have a tertiary butyl group attached to each carbon atom of the aromatic ring that is adjacent to the carbon atom to which a hydroxyl group is attached.

Organic sulfide stabilizers include, for example, divalent sulfur stabilizers (i.e., stabilizer compounds in which exactly two organic groups are attached to a sulfur atom). Some suitable divalent sulfur stabilizers are, for example, esters of thiodipropionic acid.

In some embodiments, the polymer composition of the present invention contains one or more hindered phenol stabilizer. In some embodiments, the polymer composition of the present invention contains one or more hindered phenol stabilizer and one or more peroxide decomposer.

In some embodiments, the polymer composition of the present invention contains little or no metal deactivators. Independently, in some embodiments, the polymer composition of the present invention contains little or no divalent sulfur stabilizer. Independently, in some embodiments, the polymer composition of the present invention contains little or no trivalent phosphorous stabilizer. In some embodiments, the polymer composition of the present invention contains little or no peroxide decomposers. In some embodiments, the only antioxidant compound in the polymer composition of the present invention is one or more hindered phenol stabilizer.

In some embodiments, the polymer composition of the present invention is made for the purpose of taking the polymer composition of the present invention after it is made and later mixing it with one or more matrix resin. In some embodiments, the polymer composition of the present invention, prior to mixing with a matrix resin, contains little or no polycarbonate. Independently, in some embodiments, the polymer composition of the present invention, prior to mixing with a matrix resin, contains little or no polyester. Independently, in some embodiments, the polymer composition of the present invention, prior to mixing with a matrix resin, contains little or no polycarbonate and little or no polyester. Independently, in some embodiments, the polymer composition of the present invention, prior to mixing with a matrix resin, contains little or no matrix resin. Independently, in some embodiments, the polymer composition of the present invention, prior to mixing with a matrix resin, contains little or no polymer that is not part of the multistage polymer of the present invention.

Independently, in some embodiments, the polymer composition of the present invention, prior to mixing with a matrix resin, contains little or no organophosphorous compound. Independently, in some embodiments, the polymer composition of the present invention, prior to mixing with a matrix resin, contains little or no trisodium phosphate. Independently, in some embodiments, the polymer composition of the present invention, prior to mixing with a matrix resin, contains little or no phosphate surfactant. In some embodiments, the polymer composition of the present invention, prior to mixing with a matrix resin, contains little or no phosphorous compound that is not a phosphate. In some embodiments, the polymer composition of the present invention, prior to mixing with a matrix resin, contains little or no phosphorous compound that is not a phosphate salt of a multivalent cation or an alkaline phosphate. Independently, in some embodiments, the polymer composition of the present invention, prior to mixing with a matrix resin, contains little or no wax. Independently, in some embodiments, the polymer composition of the present invention, prior to mixing with a matrix resin, contains little or no colorant.

In some embodiments, one or more polymer composition of the present invention is mixed with a matrix resin. A matrix resin is polymer that has a different composition from the multistage polymer of the present invention. In some embodiments, the weight ratio of matrix resin to multistage polymer of the present invention is 1:1 or higher; or 1.5:1 or higher; or 2.3:1 or higher; or 4:1 or higher; or 9:1 or higher; or 19:1 or higher; or 49:1 or higher; or 99:1 or higher.

Some examples of suitable matrix resins include, for example, polyolefins, polystyrene, styrene copolymers, poly (vinyl chloride) and related polymers, poly(vinyl acetate) and related polymers, acrylic polymers, polyethers, polyesters, polycarbonates, polyurethanes, polyamides and related polymers, other polymers, and mixtures thereof.

In some embodiments, the matrix resin includes one or more polycarbonate. A polycarbonate is a polymer with multiple carbonate linking units in the main polymer chain. A carbonate linking unit has the formula of structure I:

(I)

A polycarbonate has repeat units the form of structure Ia:

(Ia)

A polycarbonate having the repeat unit with the form of structure Ia is said herein to be "based on" the diol shown in structure Ib:

(Ib)

The diol in structure Ib is said herein to be a "monomer" of the polycarbonate that has structure Ia, and the repeat unit of polycarbonate structure Ia is said to be a polymerized unit of the diol in structure Ib.

For example, some suitable polycarbonates are those that have structure II:

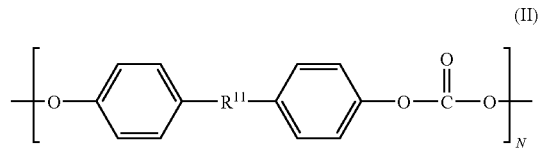
(II)

where $R^{11}$ is an organic group. The $R^{11}$ groups in the repeat units may be the same as each other or different from each other.

In some suitable polycarbonates, $R^{11}$ has the structure III:

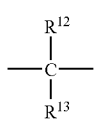
(III)

Some suitable $R^{12}$ and $R^{13}$ are, for example, independently of each other, hydrogen, alkyl, phenyl, haloalkyl, or isocyanate. Also suitable are structures in which $R^{12}$ and $R^{13}$ join together to form a cycle, such as, for example, cyclopentyl or cyclohexyl. Also suitable are, for example, substituted versions of any of the above examples of $R^{12}$ and $R^{13}$. Also suitable are, for example, structures II in which one or more hydrogen on one or both of the aromatic rings shown in structure II is substituted, for example with an alkyl group or a halogen.

Suitable polycarbonates include, for example, homopolymers with structure II in which every polymerized unit as shown within the brackets in structure II is the same. Suitable polycarbonates also include, for example, copolymers of structures shown in formula II, in which different polymerized units have different $R^{11}$ groups from each other and/or different substituents on the aromatic rings shown in structure II. Blends of suitable polycarbonates are also suitable.

One suitable polycarbonate has, for example, $R^{11}$ that has structure IV:

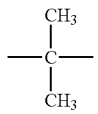
(IV)

The polycarbonate having at least some repeat units of the structure of structures II and IV is said herein to be based on Bisphenol-A ("BPA"). Suitable polycarbonates include, for example, homopolymers of polymerized units of BPA, and also copolymers that include polymerized units of BPA along with one or more other polymerized unit. In some embodiments, a homopolymer of polymerized units of BPA is used.

Some suitable polycarbonates include, for example, homopolymer or copolymer of spirobiindate bisphenol (SBI).

In some embodiments, one or more polycarbonate is used that has Mw of 10,000 or more; or 20,000 or more; or 30,000 or more. Independently, in some embodiments, one or more polycarbonate is used that has Mw of 150,000 or less; or 100,000 or less; or 75,000 or less.

Independently, in some embodiments, the matrix resin contains one or more polyester. As used herein, a polyester is not a polycarbonate, and a polyester has multiple ester linking groups in the main polymer chain. An ester linking group has structure IV:

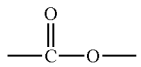
(IV)

In structure IV, the carbon atom shown is bonded to exactly two oxygen atoms. A polyester is often the reaction product of one or more polyol (a compound with two or more hydroxyl groups) with a polyacid (an anhydride or a compound with two or more carboxyl groups). For example, some suitable polyesters are linear polyesters, which are reaction products of diols (compounds that have exactly two hydroxyl groups on each molecule) with diacids (compounds that have exactly two carboxyl groups on each molecule; includes anhydrides). Also suitable are polyesters in which one or more polyol or one or more polyacid has a carbon-carbon double bond or some other functional group that can cause chain branching.

Some suitable polyesters are made from one or more alkane diol. Suitable alkane diols include, for example, diols of cycloalkanes and alpha, omega diols of linear alkanes. Some suitable alkane diols are, for example, 1,2-ethane diol; 1,3-propane diol; and 1,4-butane diol. One suitable diol of a cycloalkane is, for example, cyclohexane dimethanol. Mixtures of suitable diols are suitable. Independently, some suitable polyesters are made from one or more diacid. Some suitable diacids include, for example, aromatic diacids. Some suitable aromatic diacids include, for example, terephthalic acid, isophthalic acid, and 2,6-naphthalene dicarboxylic acid. Mixtures of suitable diacids are suitable.

Some suitable polyesters are, for example, polyethylene terephthalate (PET), polybutylene terephthalate (PBT), and mixtures thereof.

Some suitable matrix resins include, for example, copolymers of polyester monomers and polycarbonate monomers. For example, some of such copolymers are made from two or more diols and, optionally, from one or more diacid, and such copolymers contain both carbonate linking groups and ester linking groups in the main polymer chain. Some suitable matrix resins include, for example, such copolymers of BPA with one or more other diol and, optionally, with one or more diacid.

Some suitable polyesters are crystalline polymers.

Some matrix resins include, for example, blends of polymers. Some suitable blends of polymers include, for example, blends of one or more polycarbonate with one or more styrene resin. Styrene resins include, for example, polystyrene and copolymers of styrene with other monomers. Copolymers of styrene with other monomers include, for example, acrylonitrile/butadiene/styrene ("ABS") resins.

Some suitable blends of polymers include, for example, blends of one or more polycarbonate with one or more polyester. In some embodiments, a matrix resin is used that is a blend of one or more polycarbonate with one or more polyester resin. In some of such blends, the polycarbonate contains one or more resin based on BPA. In some embodiments, the polyester contains PET or PBT or a mixture thereof.

One suitable matrix resin is polycarbonate that is not blended with any other matrix resin.

In some embodiments of the present invention, one or more multistage polymer is mixed with matrix resin. In some embodiments, multistage polymer is provided in a solid form such as, for example, pellets or powder or a mixture thereof. In some embodiments, matrix resin is provided in solid form such as, for example, pellets or powder or a mixture thereof. In some embodiments, solid multistage polymer is mixed with solid matrix resin, either at room temperature (20° C.) or at elevated temperature such as, for example, 30° C. to 90° C. In some embodiments, solid multistage polymer is mixed with melted matrix resin, for example in an extruder or other melt mixer.

In some embodiments, solid multistage polymer is mixed with solid matrix resin, and the mixture of solids is then heated sufficiently to melt the matrix resin, and the mixture is further mixed, for example in an extruder or other melt-processing device. The melted mixture may or may not be cooled and then re-melted. The mixture may be used to form a useful article, for example by film blowing, profile extrusion, molding, other methods, or a combination thereof. Molding methods include, for example, blow molding, injection molding, compression molding, other molding methods, and combinations thereof.

In some embodiments, multistage polymer functions as an impact modifier for the matrix resin with which it is mixed. That is, in such embodiments, after the mixture of multistage polymer and matrix resin is mixed and melted and formed into a solid item, the impact resistance of that item will be better than the same solid item made with matrix resin that has not been mixed with multistage polymer.

In some embodiments involving multistage polymer that was in latex form, after the mixture of multistage polymer and matrix resin has been mixed and melted, the multistage polymer is in the form of individual latex particles distributed throughout the volume of the matrix resin.

The mixture of multistage polymer and matrix resin may contain other materials, such as, for example, materials left over from the process of making multistage polymer and/or matrix resin. Such leftover materials include, for example, initiator, surfactant, chain transfer agent, monomer, other materials, non-polymeric reaction products (including fragments) thereof, and mixtures thereof.

The mixture of multistage polymer and matrix resin may contain other materials, such as, for example, materials that are added to matrix resin as part of the process of manufacturing the matrix resin. For example, some matrix resins contain nucleating agents to promote rapid crystallization of the matrix resin during cooling from the melt state. It is common, for example, for some polyesters to contain one or more nucleating agent.

The mixture of multistage polymer and matrix resin may contain one or more additional materials that are added to the mixture. Any one or more of such additional materials may be added to multistage polymer or to matrix resin or to other additional materials prior to formation of the final mixture of all materials. Each of the additional materials (if any are used) may be added (alone or in combination with each other and/or in combination with multistage polymer) to matrix resin when matrix resin is in solid form or in melt form. Some suitable additional materials are, for example, dyes, colorants, pigments, carbon black, fillers, fibers, lubricants (such as, for example, montan wax), flame retardants (such as, for example, borates, antimony trioxide, or molybdates), impact modifiers that are not multistage polymers of the present invention, and mixtures thereof.

In some embodiments, the mixture of matrix resin and multistage polymer contains one or more hindered phenol stabilizer. In some embodiments, the mixture of matrix resin and multistage polymer contains one or more hindered phenol stabilizer and one or more peroxide decomposer.

In some embodiments, the mixture of matrix resin and multistage polymer contains no metal deactivators. Independently, in some embodiments, the mixture of matrix resin and multistage polymer contains no divalent sulfur stabilizer. Independently, in some embodiments, the mixture of matrix resin and multistage polymer contains no trivalent phosphorous stabilizer. In some embodiments, the mixture of matrix resin and multistage polymer contains no peroxide decomposers. In some embodiments, the only antioxidant compound in the mixture of matrix resin and multistage polymer is one or more hindered phenol stabilizer.

Independently, in some embodiments, the mixture of matrix resin and multistage polymer contains no polyvinyl chloride and no chlorinated polyvinyl chloride. Independently, in some embodiments, the mixture of matrix resin and multistage polymer contains no polyoxymethylene (also known a polyacetal).

It is to be understood that for purposes of the present specification and claims that each operation disclosed herein is performed at 25° C. unless otherwise specified.

EXAMPLES

Preparation of Multistage Polymer Latex

A stainless steel autoclave with an agitator and several entry ports was charged with 5 parts of a diphenyl oxide sulfonate emulsifier in 2688 parts of de-ionized water and 4.9 parts of sodium formaldehyde sulfoxylate and brought to pH of 4.

The autoclave was evacuated and 2297 parts of butadiene, 96.8 parts of styrene, 12 parts of cumene hydroperoxide, and 24.6 parts of divinyl benzene were added and caused to react at 70° C. over 9 hours. An additional 36.9 parts of emulsifier was also added. At the end of the reaction period no further pressure drop was observed, the residual pressure was vented.

To 4000 parts of the rubber latex having approximately 48% solids, as prepared above, were added 272 parts of styrene followed by 0.544 parts of sodium formaldehyde sulfoxylate dissolved in 416 parts of de-ionized water and 1.088 parts cumene hydroperoxide. One hour after completion of the exotherm, 280 parts of methyl methacrylate, 2.816 parts of butylene dimethacrylate, 0.28 parts of sodium formaldehyde sulfoxylate dissolved in 80 parts of de-ionized water, and 0.560 parts of cumene hydroperoxide were added and caused to react to completion. The resulting multistage polymer latex had approximately 49% solids.

This latex was treated with a 10% solids emulsion of octadecyl 3,5-di-tert-butyl-4-hydroxyhydrocinnamate (a hindered phenol stabilizer). The latex was then diluted with water to 30% solids in preparation for the coagulation step. The latex was then coagulated by adding with good mixing 750 grams of the 30% solids latex over 1 minute to 750 grams of a 0.5% (by weight) coagulant solution in water at 75° C. The slurry thus formed was heated to 98° C. for a period of one hour. The slurry was filtered on a Buchner funnel to create a wet cake of 45% solids, labeled herein "IM wet cake."

The wet cake was dried by a vacuum oven held at 30 C for 24 hours to form a powder, herein called "IM" powder.

Matrix Resin and Mixing with Multistage Polymer

The IM powder was dry blended with the Polycarbonate powder at a use level of 5% by weight IM powder, based on the total mixture. If additional stabilizers were used, beyond those already present as part of the IM powder, these were dry blended in prior to the extrusion of pellets.

The dry blend of IM powder and Polycarbonate was compounded using a Werner-Pfleiderer twin screw extruder. The screw size used was 30 mm. The RPM used was 350 RPM. The feed rate was 13.6 kg/hr (30 lb/hr). The temperature profile of the 8 zones was 130° C.-250° C.-270° C.-300° C.-300° C.-300° C.-300° C.-285° C. The extruded stands were fed through a water bath and then chopped into pellets.

Tests Conducted on the Pellets:

Heat Aging

The pellets were placed in a forced air convection over held at 120° C. for a duration of 100 hours. Upon removal from the oven, the pellets were evaluated for color. The color or the samples was observed by eye and recorded, and also the Yellowness Index (YI) was measured using standard published by American Society for Testing and Materials ("ASTM"), standard number D6290-5. Also, the melt flow was evaluated using ASTM D1238-04C using a 1.2 kg weight.

Chemical Analysis

The chemical compositions of the samples can be analyzed by standard methods. For example, the amount of calcium and phosphorous can each be measured using Inductively Coupled Plasma-Atomic Emission Spectroscopy and Ion Chromatography.

Injection Molding

The pellets were molded into 2×3×⅛ inch plaques using a 13.6 metric ton (15 ton) injection molding machine. The temperature of the melt was held at 300° C. in the barrel of the injection molding machine.

Impact Resistance

Impact Test 1: 20 parts by weight IM powder was mixed with 80 parts by weight of a blend of polycarbonate and PBT. The mixture was blended, extruded, and injection molded as described in ASTM D3641-02 and then notched to create a 3.175 mm (⅛ inch) notch. Impact testing was performed according to ASTM D256.

Impact Test 2: 4 parts by weight IM powder was mixed with 96 parts by weight of a blend of polycarbonate and ABS resin. The mixture was blended, extruded, and injection molded as described in ASTM D3641-02 and then notched to create a 3.175 mm (⅛ inch) notch. Impact testing was performed according to ASTM D256.

Comparative Example C1

Spray Dried

A solution of disodium phosphate and an emulsion of octadecyl 3,5-di-tert-butyl-4-hydroxyhydrocinnamate was added to the latex prepared by the process of Example 1 in U.S. Pat. No. 5,919,849. Sodium phosphate was added to the latex to adjust pH. The latex was then spray dried to form spray-dried IM powder.

Comparative Example C2

Coagulation with Calcium Chloride

The IM wet cake was washed with water at a weight ratio of 4/1 water to wet cake. No alkaline phosphate was added. This washed wet cake was dried in a vacuum oven at 30° C. to provide a dried powder.

Comparative Example C3

Coagulation with Calcium Chloride, Addition of Phosphate

The IM wet cake was washed with water at a ratio of 4/1 water to wet cake. The washed wet cake was blended with a solution of disodium phosphate to deliver 500 ppm of Phosphorus (mass of P on dry polymer mass). This wet cake was dried in a vacuum oven at 30° C. to provide a dried powder.

The amount of disodium phosphate added was not enough to result in any phosphate ion in equivalent excess over the calcium ion.

Formulation of Comparative Examples C1, C2, and C3

Additional amounts of stabilizer were added to the mixture of IM powder and Polycarbonate. The additional stabilizers used are specified in U.S. Pat. No. 5,919,849: a hindered phenol (ethylene bis(oxyethylene) bis(3-tert-butyl-hydroxy-5-methyl hydrocinnamate)), an organic phosphite (tris (monononylphenyl) phosphite), and an organic sulfide (pentaaerythritol tetrakis(beta-lauryl thiopropionate)).

Formulation of Comparative Example C4 and Examples 1-3

No additional amounts of stabilizer were added to the mixture of IM powder and Polycarbonate. The final level of octadecyl 3,5-di-tert-butyl-4-hydroxyhydrocinnamate hindered phenol in these formulations was half of the level of octadecyl 3,5-di-tert-butyl-4-hydroxyhydrocinnamate hindered phenol that was used in Comparative Examples C1-C3.

Comparative Example C4

The IM wet cake was washed with water at a ratio of 2/1 water to wet cake. This wet cake was treated with a solution of disodium phosphate to bring about final level of 1300 ppm of residual calcium chloride (mass of Ca on dry polymer mass) and 250 ppm of calcium phosphate (mass of P on dry polymer mass) and no substantial residual sodium phosphate.

Example 1

The IM wet cake was washed with water at a ratio of 4/1 water to wet cake. This wet cake was treated with a solution of disodium phosphate to bring about final level of no substantial residual calcium chloride, and 700 ppm of calcium phosphate (mass of P on dry polymer mass) and 450 ppm of residual sodium phosphate (mass of P on dry polymer mass).

Example 2

The IM wet cake was washed with water at a ratio of 10/1 water to wet cake. This wet cake was treated with a solution of disodium phosphate to bring about final level of no substantial residual calcium chloride, and 300 ppm of calcium phosphate (mass of P on dry polymer mass) and 450 ppm of residual sodium phosphate (mass of P on dry polymer mass).

Example 3

The IM wet cake was washed with water at a ratio of 4/1 water to wet cake. This wet cake was treated with a solution of disodium phosphate to bring about final level of no substantial residual calcium chloride, and 700 ppm of calcium phosphate (mass of P on dry polymer mass) and 700 ppm of residual sodium phosphate (mass of P on dry polymer mass).

Example 4

Results in Polycarbonate

The matrix resin used was polycarbonate, High Flow LEXAN™ powder having a Mw of 50,000. The amount of IM powder was 5% by weight, based on the total weight of the mixture. Samples were made using Method 1 and then heat aged as described above. The results of testing the above Examples and Comparative Examples is shown in the following table.

| IM powder: Example No. | Stabilizers[1] | Sodium Phosphate[2] | Calcium Phosphate[3] | Heat-Aged Color | Melt flow After Heat Age[4] | Color[5] after Inj. Mold. |
|---|---|---|---|---|---|---|
| C1 | 3 | 500 | 0 | white | 14.6 | 2.7 |
| C2 | 3 | 0 | 0 | yellow | | 11.9 |
| C3 | 3 | 0 | 500 | yellow | | 12.7 |
| C4 | 1 | 0 | 250 | yellow | 24.6 | 7.5 |
| 1 | 1 | 450 | 700 | white | 17.7 | 4.3 |
| 2 | 1 | 450 | 300 | white | 17.1 | 2.5 |
| 3 | 1 | 700 | 700 | white | 13.4 | 1.8 |

[1]Number of organic stabilizers
[2]Residual sodium phosphate (ppm P, based on dry IM powder)
[3]Residual Calcium Phosphate (ppm P/dry modifier)
[4](gm/10 min)
[5]Yellowness Index Among the coagulated samples, the Examples all gave better color in the aged polycarbonate by both color tests than all the Comparative Examples. The Examples all gave acceptable color and melt flow, even though they were made using coagulation and even though they had only one organic stabilizer. Comparative Example C1 gave acceptable performance but required the use of spray drying. Example 3 demonstrates that coagulated polymer composition can have performance superior to the spray-dried sample (Comparative Example C1), even though C1 had additional organic stabilizers.

Example 5

Impact Test in Polycarbonate/PBT Blend

Samples were made using Method 1. The matrix resin was a blend of polycarbonate with PBT. The amount of IM powder was 20% by weight based on the total weight of the mixture of IM powder and matrix resin. Samples were stored at 120° C. for 168 hours prior to impact testing. Impact test was notched Izod, ASTM D256, reported as N*m/cm (ft*lb/inch).

| IM powder Example No. | 23° C. | 0° C. | −30° C. |
|---|---|---|---|
| C1 | 7.15 (13.4) | 6.67 (12.5) | 5.50 (10.3) |
| 3 | 6.73 (12.6) | 6.30 (11.8) | 4.43 (8.3) |
| none | 0.64 (1.2) | 0.59 (1.1) | 0.53 (1.0) |

Example 6

Impact Test in Polycarbonate/ABS Blend

Samples were made using Method 1. The matrix resin was a blend of polycarbonate with ABS. The amount of IM powder was 4% by weight based on the total weight of the blend of IM powder and matrix resin. Impact test was notched Izod, ASTM D256, reported as N*m/cm (ft*lb/inch).

| IM powder Example No. | 23° C. | −30° C. |
|---|---|---|
| C1 | 4.26 (8.0) | 1.49 (2.8) |
| 3 | 4.20 (8.0) | 1.44 (2.7) |

I claim:
1. A polymer composition comprising
   (i) one or more multistage polymer comprising
      (a) a first stage polymer having Tg of 0° C. or lower,
      (b) a subsequent stage polymer having Tg of 20° C. or higher,
   (ii) one or more phosphate salt of a multivalent cation, and
   (iii) one or more alkaline phosphate, in the amount of 100 ppm or more, measured as the weight of phosphorous, based on the dry weight of said multistage polymer.
2. The polymer composition of claim 1, wherein said multivalent salt of a multivalent cation is water insoluble, and wherein the molar amount of said multivalent cation that is present in the form of said phosphate salt is, based on the total moles of said multivalent cation present in said composition, 80% or more.
3. The polymer composition of claim 1, wherein said polymer composition contains little or no organophosphorous compound.
4. The polymer composition of claim 1, wherein said polymer composition contains little or no phosphorous compound that is not an orthophosphate salt.
5. The polymer composition of claim 1, wherein said multistage polymer is a latex polymer with mean particle size that is 50 nm or higher and is less than 1 micrometer.
6. A mixture comprising the polymer composition of claim 1 and one or more matrix resin.
7. The mixture of claim 5, wherein said matrix resin is selected from the group consisting of one or more polycarbonate, one or more polycarbonate blended with one or more polyester, and one or more polycarbonate blended with one or more ABS resin.
8. A process for making a polymer composition comprising
   (I) providing a multistage polymer latex, wherein said multistage polymer comprises
      (a) a first stage polymer having Tg of 0° C. or lower,
      (b) a subsequent stage polymer having Tg of 20° C. or higher,
   (II) coagulating said multistage polymer latex by mixing said multistage polymer latex with one or more water-soluble salt of a multivalent cation,
   (III) optionally, after said step (II), washing said multistage polymer with water,
   (IV) after said step (III), mixing said multistage polymer with an aqueous solution of an alkaline phosphate,
   (V) after said step (IV), drying said multistage polymer to a water content of less than 1% by weight of water based on the dry weight of said multistage polymer,
   wherein, after said step (V), said dried multistage polymer comprises 100 ppm or more, based on the dry weight of said multistage polymer, of phosphorous that is in the form of an alkaline phosphate.

* * * * *